Patented Nov. 7, 1922.

1,434,901

UNITED STATES PATENT OFFICE.

ROBERT S. LIPSCOMB, OF NEWPORT, KENTUCKY, ASSIGNOR OF ONE-HALF TO GEORGE VEITH, OF NEWPORT, KENTUCKY.

PAINT.

No Drawing.     Application filed July 7, 1921.  Serial No. 483,027.

*To all whom it may concern:*

Be it known that I, ROBERT S. LIPSCOMB, a citizen of the United States, and a resident of Newport, in the county of Campbell and State of Kentucky, have invented a certain new and useful Paint, of which the following is a full, clear, and exact description.

My invention relates to pigments or paints, chiefly for the painting of metal to prevent corrosion thereof, although well adapted for other uses to which paints or pigments are customarily applied.

The object of my invention is to produce a black or other dark colored paint in which dark brown is a component color, which has excellent body, great lasting qualities, particularly valuable as applied to metallic structures where prevention of corrosion is necessary.

In the mining of coal in certain districts there is a certain mineral lying between the veins of coal which is known as "bone" or bone coal and so far as I am advised has been found useless in any of the arts.

This material is a dark or dull black color and is capable of fine pulverizing, due to its hardness and finely laminated nature. So far as I am advised it has no other name but "bone" or bone coal, and it appears where slate is usually found, so that its characteristics may be compared to a slate which has carbon character. Its composition taken from a test piece shows volatile matter 26.19, fixed carbon 31.21, ash 42.60, sulphur .56, and has a British thermal unit of 8600 per pound.

This material is very cheap, and, in fact, to my knowledge has been thrown away for many years in coal mining practice because of the fact that no purchasers for it have been found who would be willing to pay the cost of handling and shipment.

According to my invention, I take a quantity of this bone coal and pulverize it very fine, after which I mix it with linseed oil, dryer, varnish and, if desired, some additional pigment such as lamp black.

To illustrate the proportions which I have found by complete and adequate tests to be superior to any other paint which I have used in my occupation as bridge and iron work painter, I give the following formula, which may be varied as desired. This formula is for a black paint to be used on exposed iron work.

One pint—linseed oil
One and one-half pints—japan dryer
One pound, one ounce—pulverized bone coal
One-half ounce—lamp black
One-half pint—ordinary varnish.

This formula may be varied not only in proportions but in the additional pigment introduced. Thus for a dull, brownish black, no additional pigment need be used, and for other colors which may be produced from brownish black as a starting point different pigments may be used.

The paint so produced has a most excellent body, and due to the low cost of the main pigment it can be made at a very low price.

Having thus described my invention, what I claim as new and desire to secure by Letters Patent, is:—

1. A paint comprising pulverized bone coal and suitable painter's oil.

2. A paint comprising pulverized bone coal, painter's oil and dryer.

3. A paint composed of substantially one pound of pulverized bone coal to one pint of linseed oil, one and one-half pints japan dryer and varnish.

ROBERT S. LIPSCOMB.